(12) United States Patent
Fujimori

(10) Patent No.: US 11,434,056 B2
(45) Date of Patent: Sep. 6, 2022

(54) RICE WRAPPER AND WRAPPED RICE

(71) Applicant: Shuichi Fujimori, Suwa (JP)

(72) Inventor: Shuichi Fujimori, Suwa (JP)

( * ) Notice: Subject to any disclaimer, the term of this patent is extended or adjusted under 35 U.S.C. 154(b) by 863 days.

(21) Appl. No.: 15/632,911

(22) Filed: Jun. 26, 2017

(65) Prior Publication Data

US 2017/0305622 A1 Oct. 26, 2017

Related U.S. Application Data

(62) Division of application No. 13/139,908, filed as application No. PCT/JP2010/059039 on May 27, 2010, now abandoned.

(30) Foreign Application Priority Data

Aug. 27, 2009 (JP) .............................. JP2009-197264
Nov. 6, 2009 (JP) .............................. JP2009-255338

(51) Int. Cl.
  *B65D 65/46* (2006.01)
  *B65D 65/10* (2006.01)
  *A23L 17/60* (2016.01)

(52) U.S. Cl.
  CPC ............ *B65D 65/463* (2013.01); *A23L 17/60* (2016.08); *B65D 65/10* (2013.01)

(58) Field of Classification Search
  CPC ........ B65D 65/463; B65D 65/10; A23L 17/60
  See application file for complete search history.

(56) References Cited

U.S. PATENT DOCUMENTS

| | | |
|---|---|---|
| 2002/0118896 A1 | 8/2002 | Forman |
| 2004/0033294 A1 | 2/2004 | Suzuki et al. |
| 2006/0093711 A1 | 5/2006 | Bialick et al. |

FOREIGN PATENT DOCUMENTS

| | | |
|---|---|---|
| CN | 101511697 A | 8/2009 |
| DE | 60030513 T2 | 1/2007 |
| JP | H03-58989 U | 6/1991 |
| JP | H07-291337 A | 11/1995 |
| JP | H09-28323 A | 2/1997 |
| JP | 2000-197456 A | 7/2000 |
| JP | 2002-125606 A | 5/2002 |
| JP | 2004-250023 A | 9/2004 |
| JP | 3757387 B2 | 3/2006 |

(Continued)

OTHER PUBLICATIONS

Machine Translation JP 2004-250023A. (Year: 2004).*
Indian Examination Report and English translation for Application No. 7160/DELNP/2011, dated May 1, 2018.

*Primary Examiner* — Katherine D Leblanc
(74) *Attorney, Agent, or Firm* — Birch, Stewart, Kolasch & Birch, LLP

(57) ABSTRACT

The present invention provides a rice wrapper, in which an outer film divided into two can be easily removed. One side part of the rice wrapper 10, which includes one part of the outer film divided along the dividable section and an inner film 16a connected to the one part thereof, is separated from the other side part of the rice wrapper, which includes the other part of the outer film divided and an inner film 16b connected to the other part thereof, when the outer film 14 is divided along the dividable section 12, and a part of the dividable section 12 is connected to the one side part, and the one side part can be separated from the other side part, in one action, by pulling the dividable section 12.

3 Claims, 12 Drawing Sheets

(56) References Cited

FOREIGN PATENT DOCUMENTS

| | | |
|---|---|---|
| JP | 2007-015731 A | 1/2007 |
| JP | 2008-061596 A | 3/2008 |
| JP | 2009-165425 A | 7/2009 |
| TW | 200909312 A | 3/2009 |
| WO | WO 2009/025417 A1 | 2/2009 |

\* cited by examiner

FIG. 10A
FIG. 10B
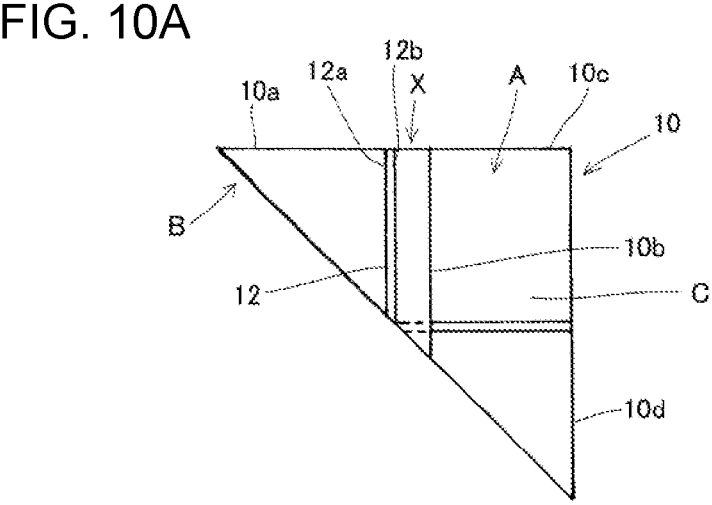
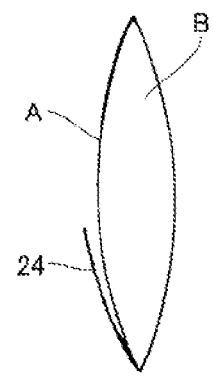
FIG. 11
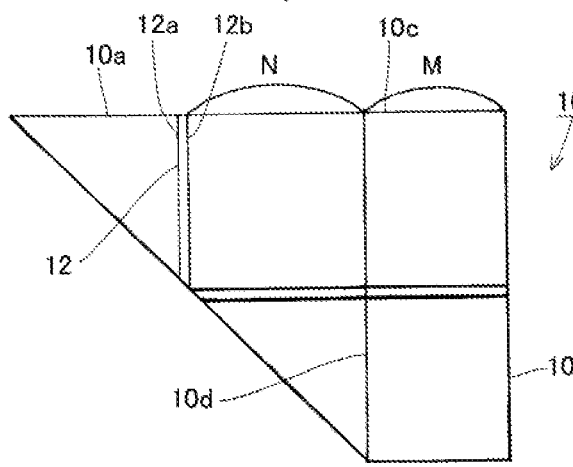
FIG. 12
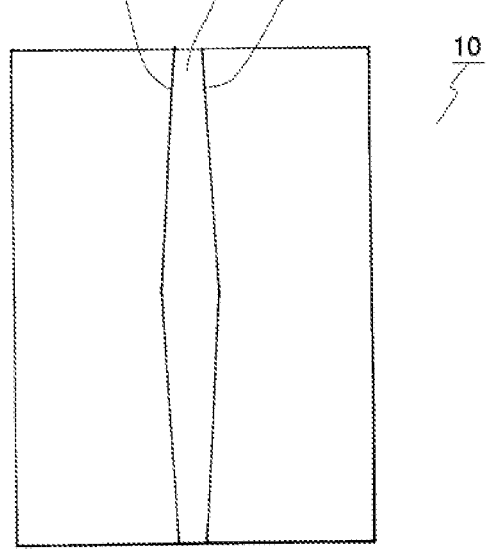

RICE WRAPPER AND WRAPPED RICE

CROSS-REFERENCE OF RELATED APPLICATIONS

This application is a Divisional of U.S. patent application Ser. No. 13/139,908, filed on Jun. 15, 2011, which was a National Phase Entry of International Application No. PCT/JP2010/059039 on May 27, 2010, which claims the benefit under 35 U.S.C. § 119(a) to Japanese Patent Application Nos. 2009-197264, filed on Aug. 27, 2009, and 2009-255338, filed on Nov. 6, 2009, all of which are hereby expressly incorporated by reference into the present application.

FIELD OF TECHNOLOGY

The present invention relates to a rice wrapper for wrapping rice, e.g., ordinary rice or sushi-rice shaped into a cone shape, and wrapped rice using the rice wrapper.

BACKGROUND OF TECHNOLOGY

A rice wrapper, in which an eatable sheet, e.g., dried seaweed, is sandwiched between inner films and an outer film, has been known (see Patent Document 1).

Cone-shaped sushi-rice is put on the inner films, and the sushi-rice is wrapped, with the rice wrapper from the both sides, so as to produce hand-rolled sushi.

To eat the hand-rolled sushi, the outer film is divided into two along a dividable section of the outer film so as to divide the rice wrapper into two (the inner films have been previously separated), so that the films can be removed and the hand-rolled sushi, in which the sushi-rice is wrapped with the seaweed, can be produced. Therefore, the sushi-rice can be wrapped with the dried eatable sheet, and delicious hand-rolled sushi can be produced.

PRIOR ART DOCUMENT

Patent Document

Patent Document 1: Japanese Laid-open Patent Publication No. 7-291337

SUMMARY OF THE INVENTION

Problems to be Solved by the Invention

To eat the sushi-rice wrapped with the rice wrapper disclosed in the Patent Document 1, cumbersome steps for removing the rice wrapper must be performed, namely a lower part (a top side) of the rice wrapper is held by one of hands (e.g., left hand), the outer film is divided into two, along the dividable section by the other hand (e.g., right hand), and then one side of the outer film (and one of the inner films) are removed by the other hand, finally the other side of the outer film (and the other inner film), which are located on the lower part side (the top side), are removed.

In some cases, the dividable section of the outer film is covered with an outer wrapping part of the rice wrapper, so the outer film cannot be suitably cut throughout the entire length.

The present invention is invented to solve the above described problems, so an object of the present invention is to provide a rice wrapper, whose outer film divided into two along a dividable section can be easily removed, and rice wrapped with said rice wrapper.

Means for Solving the Problems

The rice wrapper of the present invention comprises: an outer film being formed into a rectangular shape, the outer film having a strip-shaped dividable section, which is extended the entire length of the outer film and along which the outer film can be divided; two inner films being placed on the outer film in a state where the inner films are displaced from each other and the inner films respectively have end edge parts, which are mutually overlapped, and respectively have peripheral edge parts, which are connected to the outer film; and an eatable sheet being provided between the outer film and the inner films, one side part of the rice wrapper, which includes one part of the outer film divided along the dividable section and the inner film connected to the one part thereof, is separated from the other side part of the rice wrapper, which includes the other part of the outer film divided and the inner film connected to the other part thereof, when the outer film is divided along the dividable section, and the rice wrapper is characterized in that a part of the dividable section is connected to the one side part, and that the one side part can be separated from the other side part, in one action, by pulling the dividable section.

In the rice wrapper, the inner films may be fixed to the outer film by heat seal, and the heat-sealed section may be extended to an end of one of side edge parts, in the width direction, of the dividable section so as to connect the dividable section to the outer film of the one side part.

In the rice wrapper, a fixing tape may be taped on an end of one of side edge parts, in the width direction, of the dividable section and the outer film adjacent thereto so as to connect the dividable section to the outer film of the one side part.

In the rice wrapper, an end part of the dividable section may be connected to one of the inner films.

In the rice wrapper, a covering member for covering an exposed part of the rice to be wrapped may be provided to the outer film, and an end part of the dividable section may be connected to the covering member.

Preferably, one of side edge parts of the dividable section can be cut in the direction toward the position at which the inner film is connected to the outer film.

In the rice wrapper, the dividable section may act as one of film pieces of the outer film to be divided.

Preferably, the rice wrapper is formed into a rectangular shape, and (a length of a long side of the rectangular rice wrapper—a length of a short side thereof)<(a distance between one of the long sides of the rice wrapper and the dividable section).

In the rice wrapper, the dividable section may be shifted toward the other long side from the center of the outer film in the width direction.

In the rice wrapper, the inner films may be a wide inner film and a narrow inner film whose width is narrower than that of the wide inner film, and the wide inner film may be provided nearer the other long side of the rice wrapper.

The wrapped rice of the present invention is wrapped with a rice wrapper, which comprises: an outer film being formed into a rectangular shape, the outer film having a strip-shaped dividable section, which is extended the entire length of the outer film and along which the outer film can be divided; two inner films being placed on the outer film in a state where the inner films are displaced from each other and the inner films respectively have end edge parts, which are mutually overlapped, and respectively have peripheral edge parts, which are connected to the outer film; and an eatable sheet being provided between the outer film and the inner films, in which one side part of the rice wrapper, which includes one part of the outer film divided along the dividable section and the inner film connected to the one part thereof, is separated from the other side part of the rice wrapper, which includes the other part of the outer film divided and the inner film connected to the other part thereof, when the outer film is divided along the dividable section, and in which a part of the dividable section is connected to the one side part and the one side part can be separated from the other side part, in one action, by pulling the dividable section, a corner part of the rice wrapper is located under a part of the rice wrapper which faces the corner part so as to form the rice wrapper into a deformed cone shape, the cone-shaped rice is put in the rice wrapper, which has been formed into the cone shape, and a part of the dividable section of the outer film, which acts as an inner wrapping part, is not covered with an outer wrapping part, and the dividable section is exposed throughout the entire length of the outer film.

Effects of the Invention

In the present invention, the one side part can be separated from the other side part, in one action, by pulling the dividable section after dividing the outer film into two along the dividable section, so that cumbersome steps can be simplified.

In the rice wrapped with the rice wrapper of the present invention, no outer wrapping part of the outer film covers the entire length of the outer film, so that the wrapped rice can be stably held by one hand and the outer film can be easily divided.

BRIEF DESCRIPTION OF THE DRAWINGS

FIGS. 10A and 10B showing the rice wrapper shown in FIGS. 9A and 9B in a state where an outer wrapping part is folded;

FIG. 11 An explanation view of an example of the rice wrapper, in which M (a length of a long side of the rectangular rice wrapper—a length of a short side thereof) <N (a distance between one of the long sides of the rice wrapper and the dividable section);

FIG. 12 An explanation view of an example of the rice wrapper, in which the dividable section is formed nonlinearly;

FIG. 16 An explanation view of an example of the rice wrapper, in which the covering member is provided to an end edge part 14a;

FIG. 18 An explanation view of an example of the rice wrapper, in which the covering member is provided to the end edge part 14a;

EMBODIMENTS OF THE PRESENT INVENTION

Preferred embodiments of the present invention will now be described in detail with reference to the accompanying drawings.

Figure 1:
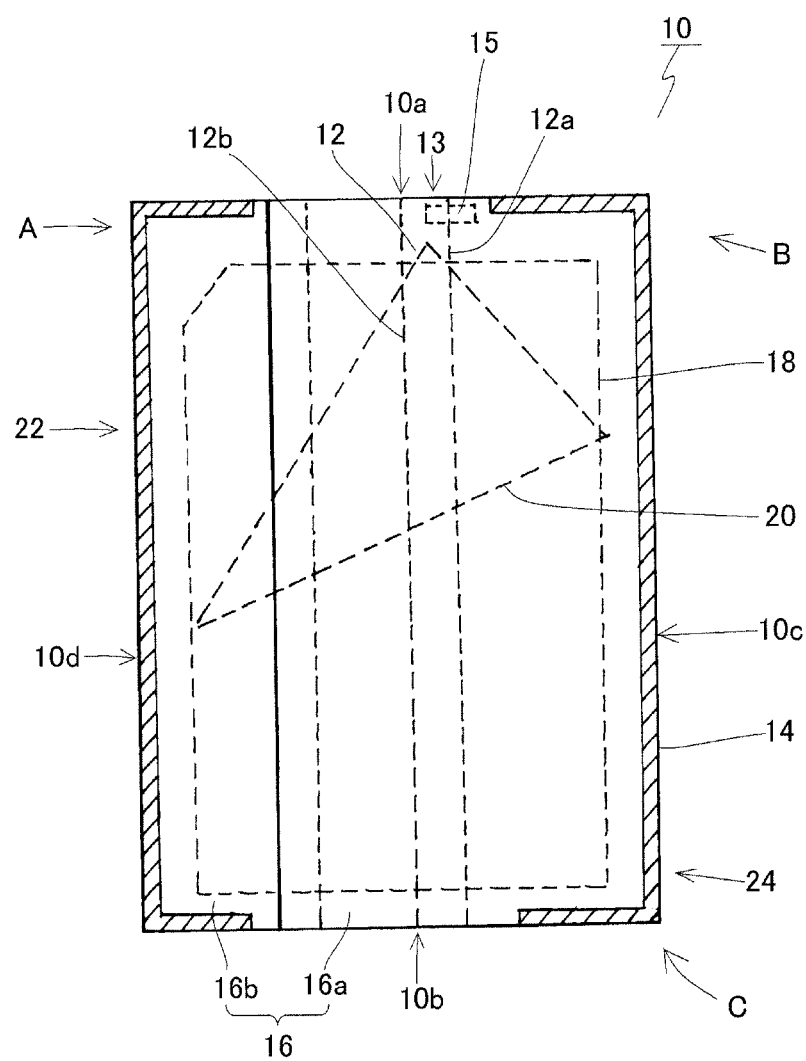
FIG. 1 An explanation view of an example of the rice wrapper.
Figure 6:
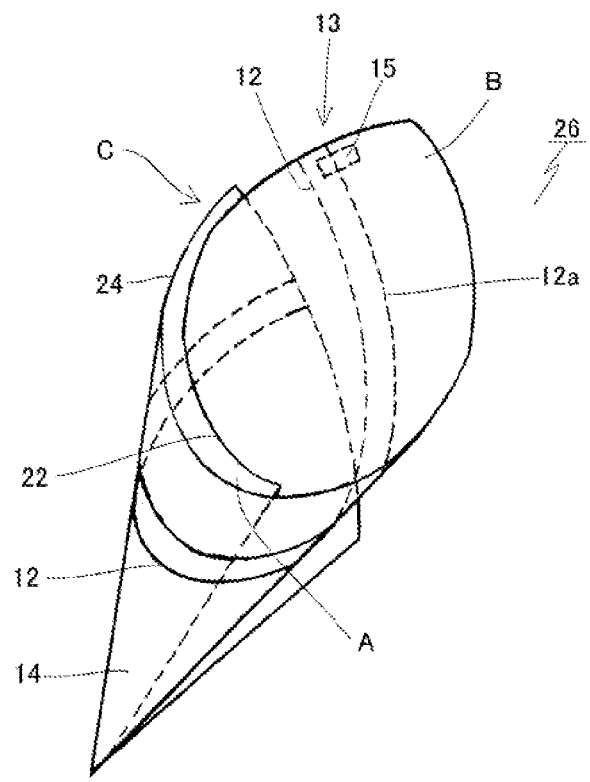
FIG. 6 An explanation view of the wrapped rice.
Figure 7:
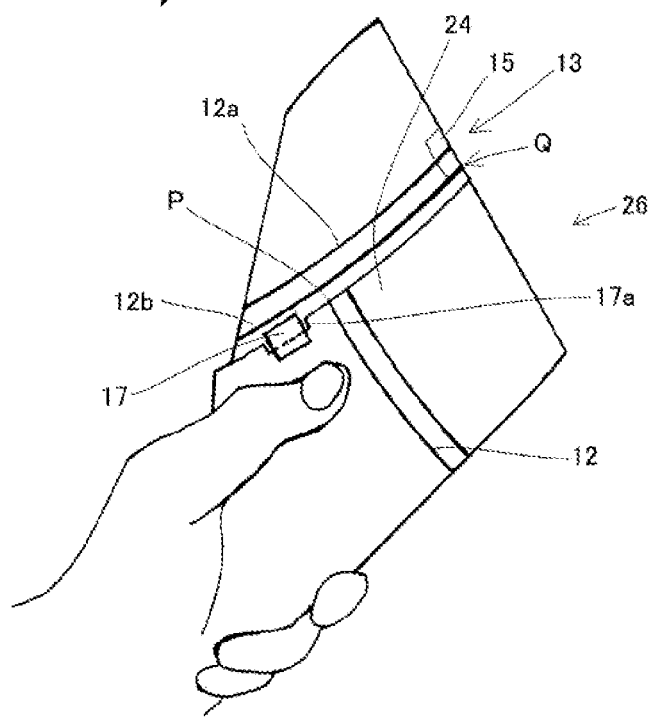
FIG. 7 An explanation view showing a division-starting point and a division-terminating point of the divisional section of the wrapped rice held by a hand.

FIG. 1 is an explanation view of a rice wrapper (hereinafter referred to as the wrapper) 10 for wrapping rice, e.g., ordinary rice or sushi-rice, and FIGS. 6 and 7 are explanation views of the rice 26 wrapped with the rice wrapper (hereinafter referred to as the wrapped rice).

The wrapper 10 comprises: an outer film 14 being formed into a rectangular shape (e.g., oblong shape as shown in FIG. 1), the outer film having a strip-shaped dividable section 12, which is extended the entire length of the outer film and along which the outer film can be divided into two; inner films 16a and 16b being placed on the outer film 14 in a state where the two inner films are displaced from each other and the inner films respectively have end edge parts, which are mutually overlapped, and respectively have peripheral edge parts, which are connected to the outer film 14 by heat seal; and an eatable sheet 18, e.g., dried seaweed, dried kelp, being provided between the outer film 14 and the inner films 16a and 16b. Note that, the above describe rectangular shape includes substantially rectangular shapes, so, for example, corners of the rectangular shape may be cut off.

Figure 2:
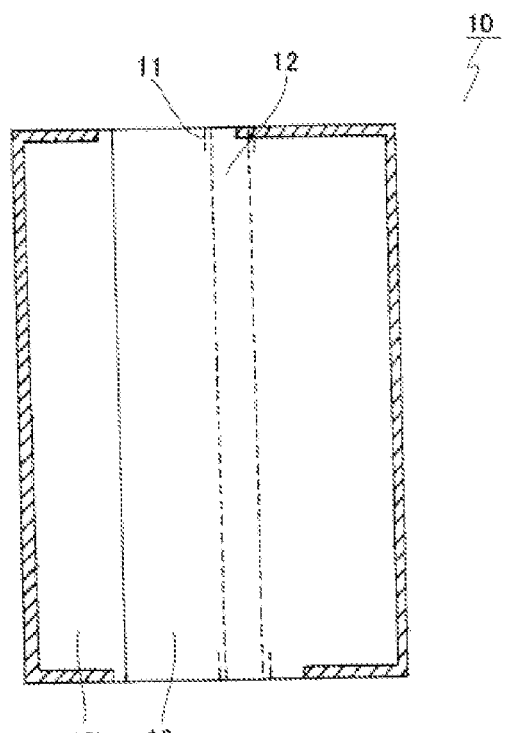
FIG. 2 An explanation view of an example of the rice wrapper, in which a dividable section is one tape having a prescribed width.
Figure 3:
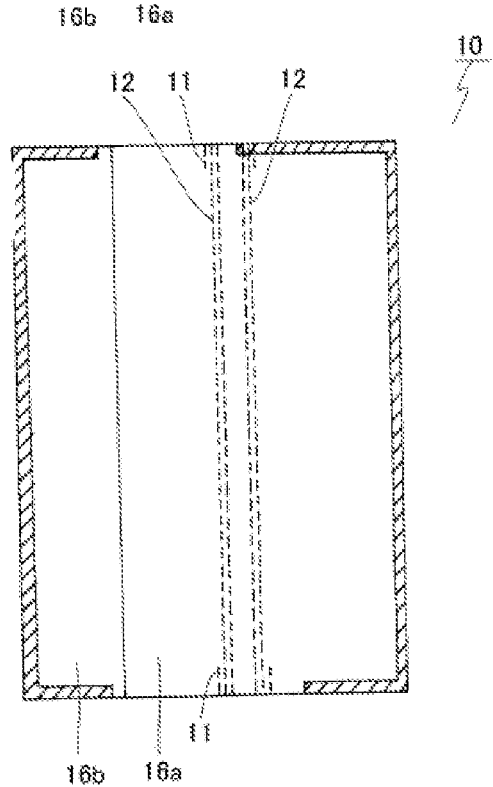
FIG. 3 An explanation view of an example of the rice wrapper, in which the dividable section is constituted by two tapes.
Figure 4:
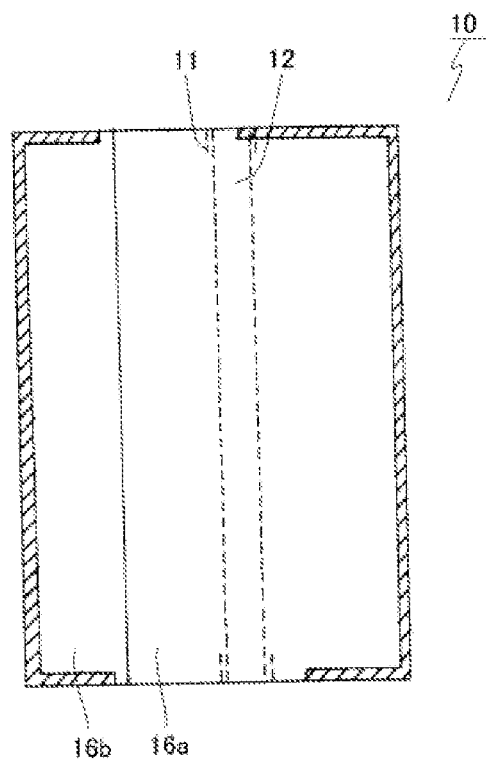
FIG. 4 An explanation view of an example of the rice wrapper, in which the dividable section is constituted by two perforations.
Figure 5:
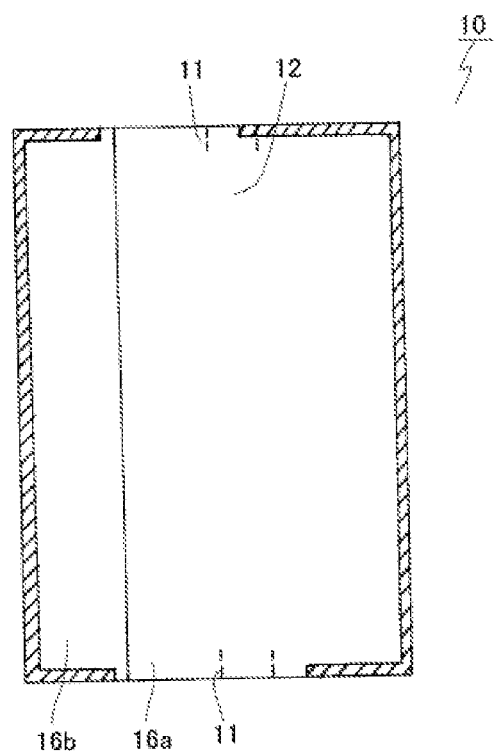
FIG. 5 An explanation view of an example of the rice wrapper, in which an outer film is composed of an orientational film and the dividable section is constituted by two incisions.

As shown in FIG. 2, the dividable section 12 may be constituted by one tape having a prescribed width; as shown in FIG. 3, it may be constituted by two tapes; further, as shown in FIG. 4, it may be constituted by two perforations. Note that, in any cases, incisions 11 are formed in the outer film 14, and they are located on the both sides of each end of the dividable section 12 so as to easily start to divide the outer film. In FIG. 3, the two tapes and a part of the outer film between the tapes will be cut; in FIG. 4, a part of the outer film between the two perforations will be cut. As shown in FIG. 5, the outer film 14 may be composed of an orientational film, which can be easily cut in the longitudinal direction, as the dividable section 12, and two incisions 11 are formed in one end part of the outer film so as to divide (separate) the outer film from the incisions 11. Further, two outer films 14 may be partially connected each other by, for example, heat seal as the dividable section.

The inner films 16 are fixed to the outer film 14 by, for example, heat seal.

Positions of the sealed parts (the parts highlighted by hatching in FIG. 1) are not limited as far as one side part of the wrapper, which includes one part of the outer film divided along the dividable section and the inner film 16a connected to the one part thereof, is separated from the other side part of the rice wrapper, which includes the other part of the outer film divided and the inner film 16b connected to the other part thereof, when the outer film 14 is divided into two along the dividable section 12. Namely, one heat-sealed part, in which the inner film 16a is connected to the one part of the outer film 14, and the other heat-sealed part, in which the inner film 16b is connected to the other part of the outer film 14, are respectively located on the both sides of the dividable section 12.

The present embodiment is characterized in that a part of the dividable section is connected to the one side part, and that the one side part can be separated from the other side part, in one action, by pulling the dividable section 12.

For example, in the present embodiment, a longitudinal end of one side edge 12a of the dividable section 12 (an end located near a division-terminating point) is an undividable section 13. Note that, the one side edge 12a, in the width direction of the dividable section 12, means one of the two tapes shown in FIG. 3, one of the two perforations shown in FIG. 4 and one of two proposed lines to be cut from the incision 11.

The other side edge 12b of the dividable section 12 is extended the entire length of the outer film 14 so as to divide the outer film into two.

To form the undividable section 13, a fixing tape 15 is taped to connect the longitudinal end of the one side edge 12a of the dividable section 12 to a part of the outer film 14 adjacent to the longitudinal end. Further, as shown in FIGS. 2-5, the undividable section 13 may be formed by extending the heat-sealed part, in which the inner film 16 is fixed to the outer film 14, until reaching the longitudinal end of the one side edge 12a of the dividable section 12.

A method of producing the wrapped rice 26 (see FIG. 6), in which rice 20, e.g., ordinary rice or sushi-rice, is wrapped with the above described wrapper 10 (note: sushi-rice will be used as the rice to be wrapped in the following description.), will be explained.

The oblong wrapper 10 (see FIG. 1) is used in the present embodiment.

The cone-shaped sushi-rice 20 is put on the inner films 16 of the wrapper 10 in a state where a tapered top part of the sushi-rice is directed to an intermediate part of a long side 10d of the wrapper 10 (a bottom part of the sushi-rice is directed to a corner B) and the sushi-rice is oriented at an angle of about 45 degrees with respect to the wrapper 10 (see FIG. 1).

Next, a triangular part of the wrapper 10, in which a corner A constituted by the long side 10d and one short side 10a is an apex of the triangle, is wound on an outer face of the sushi-rice 20, as an inner wrapping part 22 (see FIG. 6).

Figure 9A:
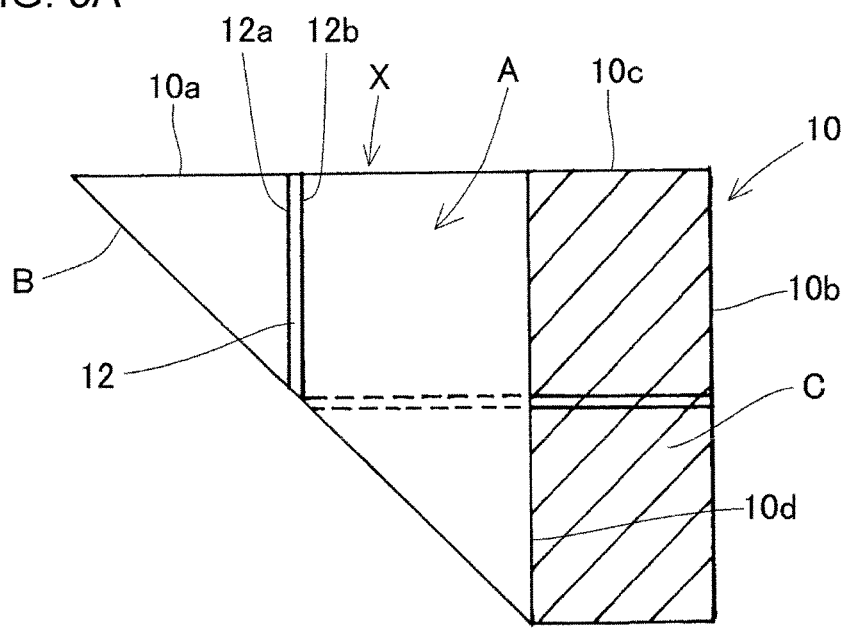
FIGS. 9A and 9B showing the rice wrapper shown in FIG. 8 in a state where an inner wrapping part is folded.

Then, a part C of the wrapper 10 having a prescribed width, which is located nearer the other short side 10b, is placed on the inner wrapping part 22, as an outer wrapping part 24 (see FIGS. 6 and 9A).

Further, the outer wrapping part 24 is fixed to the inner wrapping part 22 by, for example, tape (see FIG. 7) or heat seal so as to form the wrapped rice 26. Note that, the sushi-rice 20 is not shown in FIG. 6.

In FIG. 6, the dividable section 12 of the outer film 14, which acts as the inner wrapping part 22, is not covered with the outer wrapping part 24, so it is suitable to expose the dividable section 12 throughout the entire length of the outer film 14.

In case that the dividable section 12 of the outer film 14 is not covered with the outer wrapping part 24 and the dividable section is exposed throughout the entire length of the outer film, the dividable section 12 can easily divide the outer film 14, without being interfered with the outer wrapping part 24, and the outer film can be removed from the sushi-rice 20 together with the inner films 16, which have been previously separated, so that the eatable sheet 18 can be wound on the sushi-rice 20.

In FIG. 7, the wrapped rice 26 is held by a hand, a division-starting point P of the dividable section 12 and a division-terminating point Q are shown, the dividable section 12 is exposed throughout the entire length of the outer film 14 so that the wrapped rice 26 can be easily held and the outer film 14 can be easily divided by pulling the dividable section 12. Note that, in case that the outer wrapping part 24 is fixed on the inner wrapping part 22 by a sealing tape 17, if there is a possibility that the sealing tape is taped on (covers) the dividable section 12, a part of the side edge of the outer wrapping part 24 is slightly cut (forming a cutout 17a), as shown in FIG. 7, so as not to cover the dividable section 12 with the sealing tape 17. Note that, in the wrapped rice 26, the position of fixing the outer wrapping part 24 to the inner wrapping part 22 by the sealing tape 17 or heat seal is located on the tapered top part (the lower part) side with respect to the dividable section 26, as shown in FIG. 7, so as not to connect the parts of the outer film 14, which have been divided, to each other.

In the present embodiment, as described above, the undividable section 13, at which the outer film 14 cannot be divided into two, is located at the one longitudinal end of the side edge 12a of the dividable section 12 (the end located near the division-terminating point).

When the outer film 14 is divided by pulling the dividable section 12 from the division-starting point P toward the division-terminating point Q, the outer film 14 is not divided at the undividable section 13 located on the side edge 12a, but the outer film 14 is completely divided into two along the other edge 12b.

As described above, the outer film 14 is completely divided into two along the side edge 12b of the dividable section 12, but the dividable section 12 is connected to the one of divided parts of the outer film 14 (an upper part of the outer film) at the undividable section 13. Therefore, the one side part of the wrapper, which includes the one part of the outer film still connected to the dividable section 12 and the inner film (upper film) 16a connected to the one part thereof, can be separated (divided), upward, from the other side part of the rice wrapper, which includes the other part of the outer film divided and the inner film 16b connected to the other part thereof, (in a state where the eatable sheet 18 is left on the sushi-rice 20) by pulling the dividable section 12.

In the present embodiment, the conventional two steps for removing the outer film, i.e., the steps of: removing the dividable section 12 after dividing the outer film 14 by the dividable section 12; and holding and removing the divided outer film 14 by a right hand, can be omitted, namely the step of removing the one part of the divided outer film, etc. can be performed by only the step of dividing the outer film by pulling the dividable section 12.

To remove the undividable section 13 together with the upper part of the outer film 14 divided by the dividable section 12, the undividable section 13 is located in the upper part of the outer film 14, i.e., the longitudinal end of the side edge 12a nearer the long side 10c (see FIG. 1).

Figure 8:
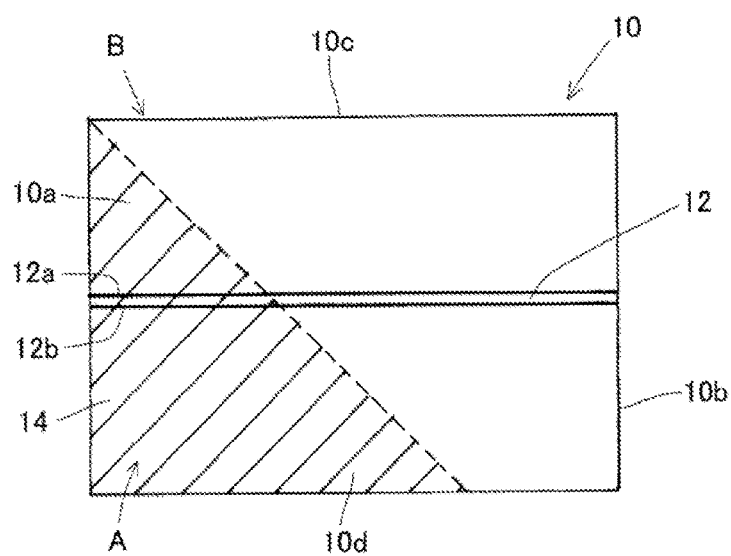
FIG. 8 An explanation view of an example of the rice wrapper, in which a length of a long side is less than 1.5 times as long as that of a short side.

In case of the wrapped rice 26 wherein the dividable section 12 of the outer film 14 is not covered with the outer wrapping part 24 and is exposed throughout the entire length of the outer film 14, the wrapper 10 shown in FIG. 8 may be used.

In the wrapper 10 shown in FIG. 8, the dividable section 12 is provided along a transverse center line of the outer film 14.

A length of the long side 10c of the wrapper 10 is less than 1.5 times as long as that of the short side 10a (10b).

To easily hold the wrapped rice, the preferable length of the short side 10a of the wrapper 10 (the width of the wrapper) is 10 cm or more.

A method of wrapping the sushi-rice (or ordinary rice) with the above described wrapper 10 will be explained. Note that, the sushi-rice (or ordinary rice) is not shown in the drawings for clear explanation.

Figure 9B:
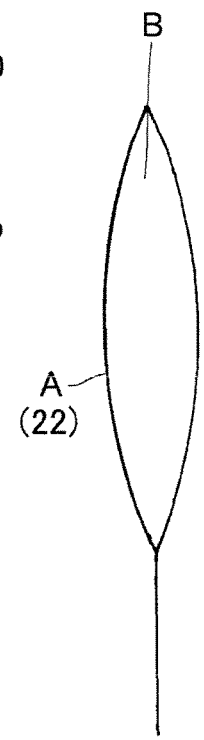

In FIG. 9A, a triangular part, which includes the corner A and is located nearer the short side 10a, (i.e., a hatched part in FIG. 8: the part constitutes a part of the inner wrapping part) is folded (actually, it is folded along the outer face of the sushi-rice). The corner A is folded so as to make the long side (one long side) 10d, which is located nearer the corner A, perpendicular to the long side (the other long side) 10c nearer the corner B. In this state, the sushi-rice is wrapped, so the short side 10a does not overlap the long side 10c; as viewed from the direction shown in FIG. 9A, it looks like the short side 10a overlaps the long side 10c, so the wrapped rice has a good appearance. Note that, FIG. 9B is a view seen from a direction X shown in FIG. 9A.

Next, as shown in FIG. 10A, a part of the wrapper 10 nearer the short side 10b (a hatched part C in FIG. 9A), which has a prescribed width, is folded, onto the corner A, along the long side 10d (actually, the part is bent in an arc along the outer face of the sushi-rice) so as to form the outer wrapping part 24. The part covered with the outer wrapping part 24 is the inner wrapping part 22. In this case, the long side 10c of the wrapper 10 overlaps the short side 10a thereof (see FIG. 10A), so the wrapped rice has a good appearance.

By fixing the outer wrapping part 24 onto the inner wrapping part 22 with the sealing tape (not shown), heat seal, etc., the wrapped rice 26 is completely produced. Note that, a proper sushi-item or items (not shown) are put on the exposed part of the sushi-rice. FIG. 10B is a view seen from a direction X shown in FIG. 10A.

In case that the length of the long side 10c is less than 1.5 times as long as that of the short side 10a, the short side 10b does not reach the dividable section 12 as shown in FIG. 10A, so that the dividable section 12 can be exposed throughout the entire length of the outer film 14.

In the above described embodiment, the dividable section 12 is provided along the transverse center line of the outer film 14, but, in case that the length of the long side 10c is short, e.g., 1.3 times that of the short side 10a, the dividable section 12 can be entirely exposed even if the position of the dividable section 12 is further shifted, from the center of the short side 10a, toward the long side 1d.

On the other hand, in case that the position of the dividable section 12 is shifted, from the center of the short side 10a, toward the long side 10c, the dividable section 12 can be entirely exposed even if the length of the long side 10c is greater than 1.5 times as long as that of the short side 10a, e.g., 1.8 times. By locating the dividable section 12 at the position shifted toward the long side 10c, the dividable section 12 of the wrapped rice 26 is shifted upward (toward an upper part of the hand-rolled sushi), so that the lower part of the wrapped rice 26 can be easily and suitably held by a hand.

As clearly shown in FIG. 11, if M (the length of the long side 10c—the length of the short side 10b)<N (a distance between the long side (one of the long sides) 10d and the dividable section 12), the dividable section 12 is not covered with the outer wrapping part 24 when the part of the wrapper located nearer the short side 10b is folded along the long side 10d.

Since the dividable section 12 has the fixed width, the above described distance (i.e., the distance between the long side 10d and the dividable section 12) is the distance between the long side 10d and the side edge close to the long side 10d, i.e., the side edge 12b of the dividable section 12. As shown in FIG. 12, the dividable section 12 may be formed nonlinearly with fixed width, and the above described distance (i.e., the distance between the long side 10d and the dividable section 12) is the distance between the long side 10d and the side edge close to the long side 10d, i.e., the side edge 12b of the dividable section 12.

Figure 13:
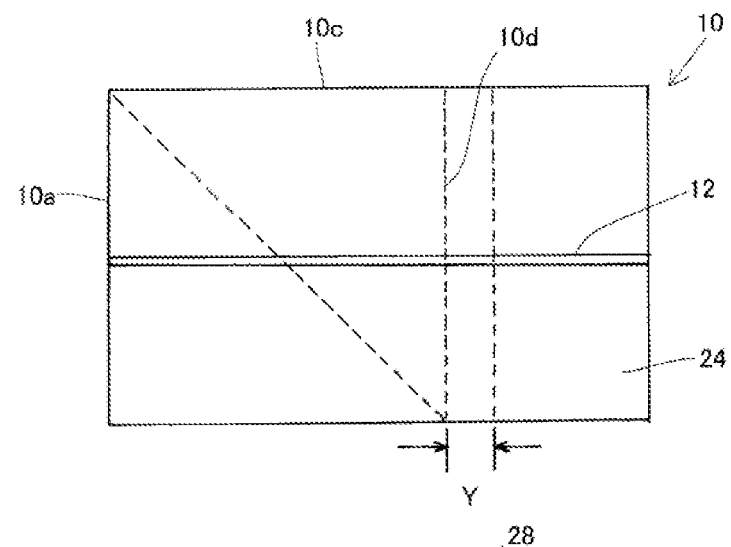
FIG. 13 An explanation view of an example of the rice wrapper, in which a folding line is shifted outward.

In case of M (the length of the long side 10c—the length of the short side 10b)>N (a distance between the long side 10d and the dividable section 12), if a folding line of the outer wrapping part 24 is shifted a prescribed distance Y from the folded long side 10d as shown in FIG. 13, the dividable section 12 can be entirely exposed. In this case, the sushi-rice will be slightly exposed in the tapered top part of the hand-rolled sushi, but it does not make any problems.

Preferably, as shown in FIGS. 1-5, the two inner films 16 are a wide inner film 16a and a narrow inner film 16b whose width is narrower than that of the wide inner film 16a. In this case, the narrow inner film 16b is provided nearer the long side 10d of the wrapper 10, so that the divided films can be easily removed from the ordinary rice or sushi-rice. The wide inner film 16a may be placed on or under the narrow inner film 16b. Further, one or both of the films in the overlapped part may be folded (not shown).

Preferably, as shown in FIG. 1, a corner of the eatable sheet 18, which corresponds to the corner A, is cut off. With this structure, the divided films can be easily removed, without engaging with the corner of the eatable sheet 18, when the divided films are pulled out or removed from the sushi-rice or ordinary rice.

By employing the wide inner film 16a and the narrow inner film 16b as the inner films 16, an upper part of the outer film 14 (a part including the corner B, see FIG. 6) and the wide inner film 16a, which is one of the inner films 16, can be easily pulled out upward, in a state where the eatable sheet 18 is left on the sushi-rice 20, when the outer film 14 is divided into two by pulling the dividable section 12. Frictional resistance between the wide inner film 16a, which is one of the inner films 16, and the sushi-rice 20 is great, but the inner film can be easily removed, without being interfered with the eatable sheet 18, by pulling the dividable section 12 upward, in spite of existing the eatable sheet 18, because the inner film is pulled toward an open space above the sushi-rice 20.

It is difficult to pull the lower part of the divided outer film 14 and the narrow inner film 16b, which is one of the inner films 16 and which is fixed to the lower part, downward due to existing the eatable sheet 18 which is made gradually narrow downward, but they can be easily peeled from the eatable sheet 18 and the sushi-rice 20 because the inner film 16 left is the narrow inner film 16b.

Especially, in case that a part of the narrow inner film 16b, located on the short side 10a of the corner A, which is shown in FIG. 1, is not heat-sealed to the outer film 14 and/or the corner of the eatable sheet 18 corresponding to the part is cut off, the divided films can be easily pulled out downward.

To easily pull out the divided films, cooking oil may be mixed with the sushi-rice 20. Cooking oil may be applied to inner surfaces of the inner films 16. Eatable powders, e.g., rice powders, may be applied to a surface of the sushi-rice or ordinary rice so as to restrain viscosity of the rice, so that slippage of the rice can be increased and the divided films can be easily pulled out.

In the above described embodiments, the wrapped rice 26 is produced by wrapping the wrapper 10 on the sushi-rice 20 shaped into the cone shape. In case of actually producing the wrapped rice 26, the wrapper 10 is previously formed into a deformed cone shape shown in FIG. 6, and then the sushi-rice 20, which has been shaped into the cone shape, is dropped thereinto, so that the wrapped rice 26 can be produced suitably. With this process, the wrappers 10, which have been previously formed into the deformed cone shape, can be continuously fed to a sushi production machine (not shown), and the sushi-rice 20, which has been previously shaped into the cone shape, can be sequentially dropped into each of the wrappers 10, so that automatic production of the wrapped rice can be realized.

The wrapper 10 formed into the deformed cone shape (see FIG. 6) will be explained.

In the wrapper formed into the deformed cone shape, the relationship between the corner A and the part C facing the corner A is that the corner A is located inside and the part C facing the corner A is located outside (see FIG. 6).

In case of the rectangular wrapper 10, the wrapper has the following structure.

Namely, the corner A, which is formed by the short side 10a and the long side 10d of the wrapper 10, is located at (placed on) an intermediate part of the long side 10c, the part nearer the corner A is wound as the inner wrapping part 22, the part of the wrapper 10 located nearer the short side 10b is wound on the inner wrapping part 22, as the outer wrapping part 24, and fixed to the inner wrapping part 22, so that the wrapper, which is formed into the deformed cone shape and in which an intermediate part of the long side 10d is the tapered top part, can be produced (see FIG. 6).

Figure 14:
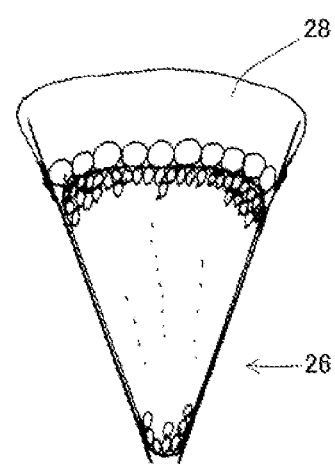
FIG. 14 An explanation view of an example of the rice wrapper including a covering member.
Figure 15:
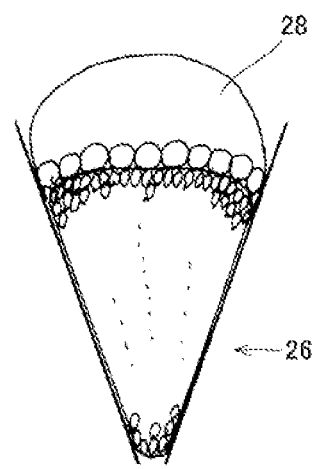
FIG. 15 An explanation view of another example of the rice wrapper including the covering member.

In each of FIGS. 14 and 15, the wrapped rice 26 is covered with a covering member (cap) 28 so as to cover the exposed part of the sushi-rice 20 (a bottom part of the cone shape).

In FIG. 14, the covering member 28 is provided to outside of the wrapped rice 26, and the covering member 26 may be fixed to the wrapped rice 26 by, for example, fixing seal (not shown). Preferably, the covering member 28 is removed together with the outer film 14 when the outer film is divided.

In FIG. 15, a lower edge of the covering member 28 is clamped inside of the upper part of the wrapped rice 26 (between the sushi-rice and the wrapper) so as to cover the wrapped rice 26.

Figure 16:
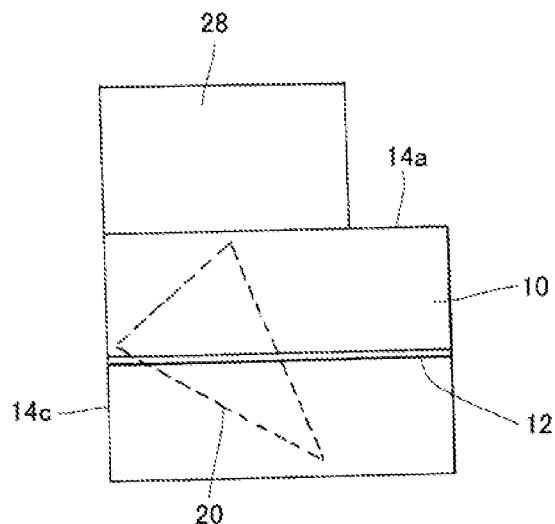
Figure 17:
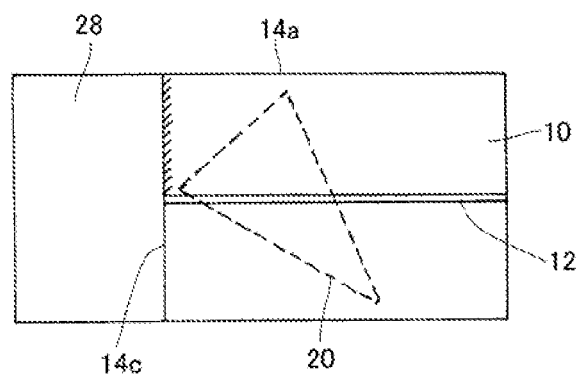
FIG. 17 An explanation view of an example of the rice wrapper, in which the covering member is provided to an end edge part 14c.
Figure 18:
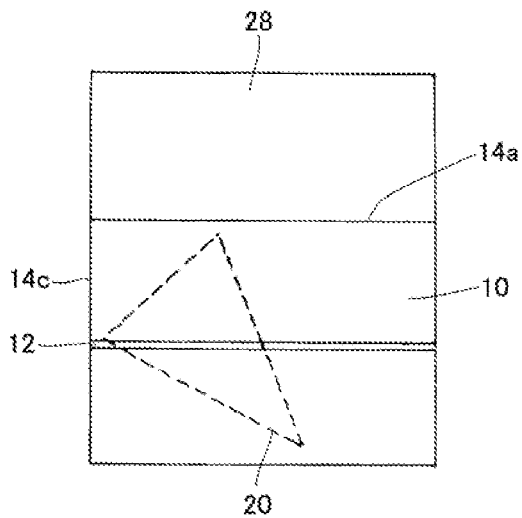
Figure 19:
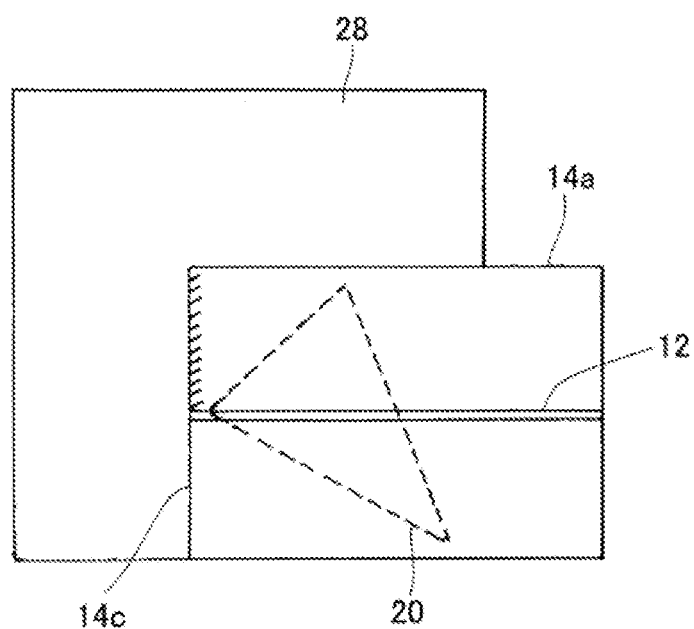
FIG. 19 An explanation view of an example of the rice wrapper, in which the covering member is provided to the end edge parts 14a and 14c.
Figure 20:
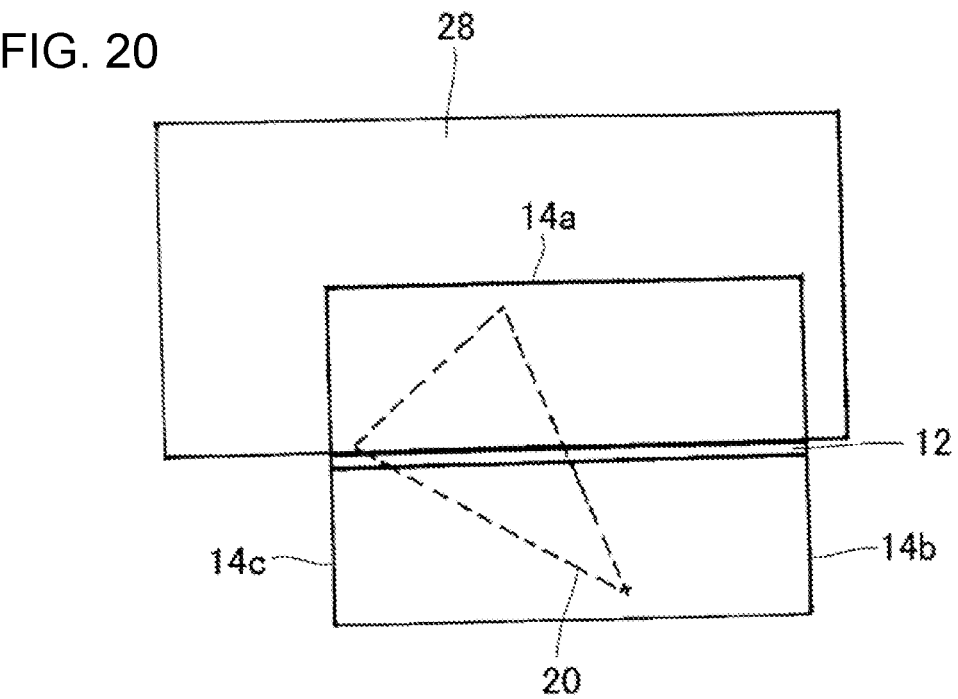
FIG. 20 An explanation view of an example of the rice wrapper, in which the covering member is provided to the end edge parts 14a, 14b and 14c.

FIGS. 16 and 18 show examples, in each of which the covering member 28 is integrated with a side edge 14a of the outer film 14 of the wrapper 10; FIG. 17 shows an example, in which the covering member 28 is integrated with a side edge 14c adjacent to the side edge 14a; FIG. 19 shows an example, in which the covering member 28 is integrated with the side edges 14a and 14c; and FIG. 20 shows an example, in which the covering member 28 is integrated with the side edges 14a, 14b and 14c.

In the examples shown in FIGS. 17 and 19 in each of which the covering member 28 is integrated with the side edge 14c, the covering member 28 is fixed to the one part of the outer film 14, which is divided into two by the dividable section 12, by, for example, heat seal. In each of the examples shown in FIGS. 16-20, the covering member 28 and the outer film 14 may be separately formed, and the covering member may be heat-sealed to a proper position of the outer film 14; the covering member 28 and the outer film 14 may be integrally formed. In each of the examples shown in FIGS. 16-20, the cone-shaped sushi-rice or ordinary rice is shown by dotted lines.

In the above described embodiment, the fixing tape 15 is taped at the end of the side edge 12a of the dividable section 12 so as to prevent the part of the outer film 14 from being divided, but the end of the dividable section 12 may be heat-sealed to the corresponding inner film 16a (not shown). Note that, the both side edges of the dividable section 12 are capable of dividing the outer film. With this structure too, when the dividable section 12 divides the outer film 14, the one side part of the wrapper, which includes the one part of the outer film still connected to the dividable section 12 and the inner film 16a connected to the one part thereof, can be separated from the other side part of the rice wrapper, which includes the other part of the outer film divided and the inner film 16b connected to the other part thereof, in one action, by pulling the dividable section 12.

Further, in the examples shown in FIGS. 17, 19, etc., the end of the dividable section 12 may be fixed to the covering member 28 (not shown). The both side edges of the dividable section 12 are capable of dividing the outer film. With this structure too, when the dividable section 12 divides the outer film 14, the one side part of the wrapper, which includes the covering member 28 connected to the dividable section 12, the one part of the outer film still connected to the covering member 28 and the inner film 16a connected to the one part thereof, can be separated from the other side part of the rice wrapper, which includes the other part of the outer film divided and the inner film 16b connected to the other part thereof, in one action, by pulling the dividable section 12. Note that, in case of providing the covering member 28 and covering the dividable section 12 with the covering member 28, an incision (not shown), through which the dividable section 12 can pass, may be formed in the covering member 28 so as to smoothly divide by the dividable section 12.

Figure 21:
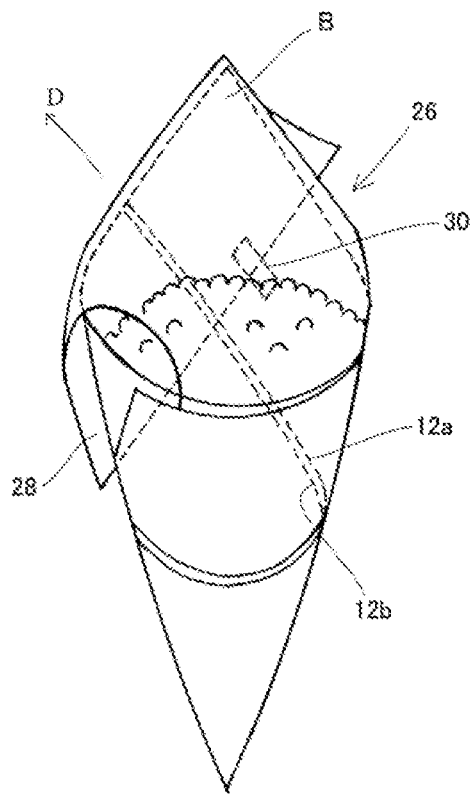
FIG. 21 An explanation view showing a position of a fixing tape for fixing the covering member.

FIG. 21 shows a position of a fixing tape 30 for fixing the covering member 28 to the outer film 14.

The fixing tape 30 is fixed to the part of the outer film 14, which has been divided from the other part of the outer film 14 by the dividable section 12 and which is connected to the dividable section 12 (i.e., the part of the outer film located nearer a top part B shown in FIG. 21).

The end of the dividable section 12 is pulled in a direction D shown in FIG. 21, an incision (not shown) may be previously formed in a part of the covering member 28, as described above, so as to divide the outer film by the dividable section 12.

Figure 22:
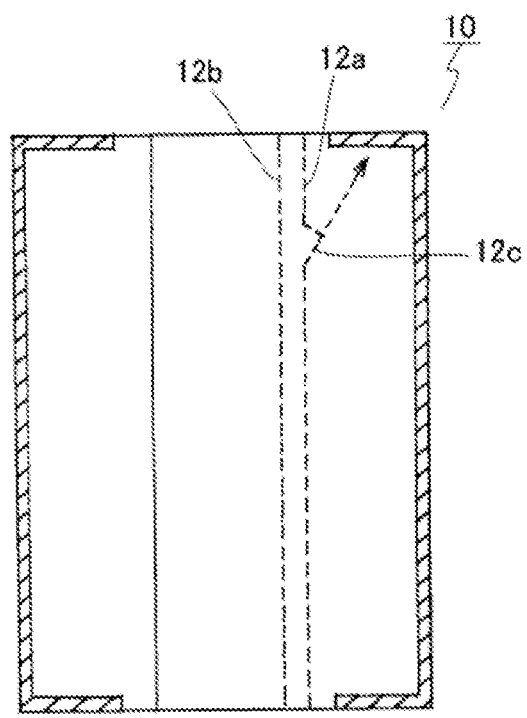
FIG. 22 An explanation view of an example of the rice wrapper, in which a cutting guide is formed in the dividable section.

FIG. 22 shows another embodiment.

In FIG. 22, a cutting direction guide 12*c* is provided to an intermediate part of the side edge 12*a* of the dividable section 12, and a cutting direction of the outer film 14, which is cut by the dividable section 12, is diagonally directed as shown by a dotted line; note that, the outer film may be cut until reaching the sealed part (hatched part), in which the outer film 14 and the inner film 16*a* are sealed, and the outer film 14 may be uncut in the sealed part (in this case, the outer film is composed of a material which can be continuously cut in a changed direction when the cutting direction is changed). In the present embodiment, the one side part of the wrapper can be separated from the other side part thereof, in one action, by pulling the dividable section 12. Note that, in case of providing no cutting direction guide 12*c*, cutting lines of the dividable section 12, which are formed for cutting the outer film in the directions of the side edges 12*b* and 12*c*, may be previously formed.

In the embodiment shown in FIG. 22, the fixing tape 15, which is taped on the end part of the side edge 12*a* of the dividable section 12 and the part of the outer film 14 adjacent thereto as shown in FIG. 1, can be omitted, so the sealed part (adhered part), in which the outer film 14 and the inner film 16 are sealed, may be act as the undividable section.

Note that, in the embodiment shown in FIG. 22, if the cutting direction is changed by the cutting direction guide 12*c*, fixing means (e.g., fixing tape 17) for fixing the outer wrapping part 24 to the inner wrapping part 22 is not provided on the cutting line.

Figure 23:
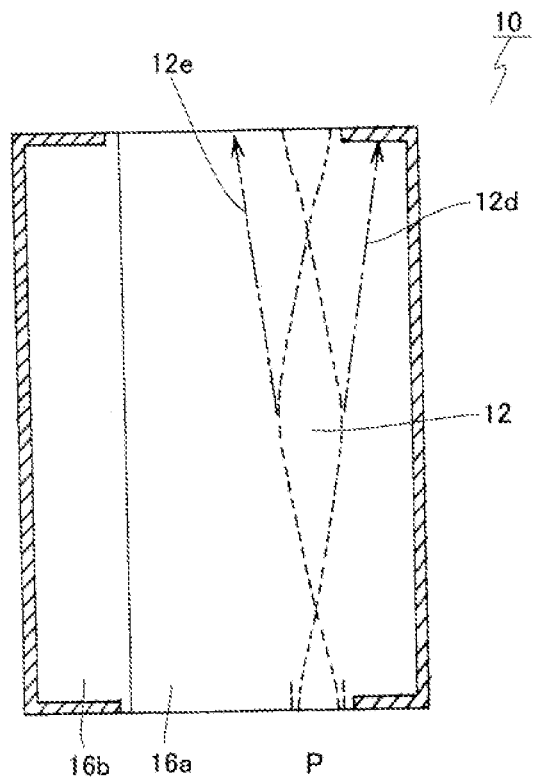
FIG. 23 An explanation view of another embodiment of the rice wrapper.

FIG. 23 shows modification of the embodiment shown in FIG. 22.

In the modified embodiment, the side edges of the dividable section 12 are two crossed lines. When the dividable section 12 cuts the outer film 14 from the division-starting point P, the cutting direction of the dividable section 12 is changed from the cross point of the lines, so that the outer film is cut in the diagonal directions shown by dotted lines (12*d* and 12*e*). Even if the cutting end 12*d* reaches the sealed part (hatched part), in which the outer film 14 and the inner film 16*a* are sealed, the outer film 14 is not cut in the sealed part (in this case, the outer film is composed of a material which can be continuously cut in the changed direction when the cutting direction is changed to the directions 12*d* and 12*e*).

Figure 24:
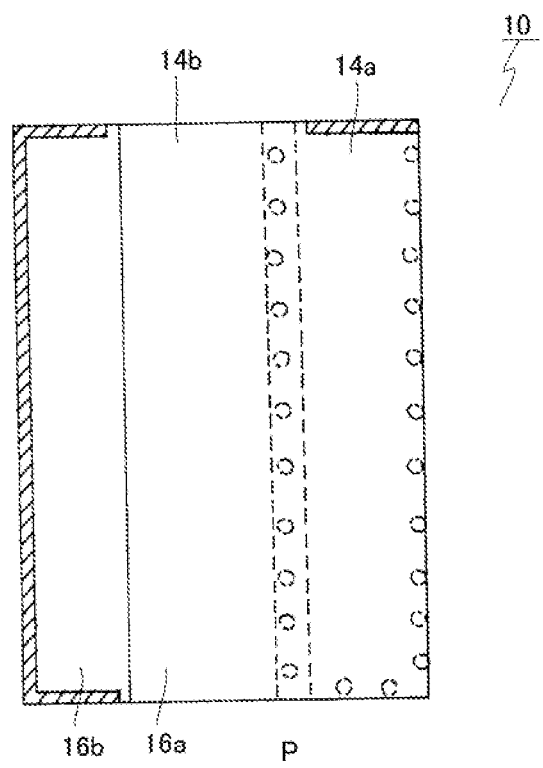
FIG. 24 An explanation view of further embodiment of the rice wrapper.

FIG. 24 shows further embodiment of the wrapper 10.

In the present embodiment, the outer film 14 is constituted by two film pieces 14*a* and 14*b*, whose center parts are overlapped each other. The two film pieces 14*a* and 14*b* are dividably connected, in the overlapped part, by, for example, weak spot heat seal. Most of side edges of the film piece 14*a* are dividably connected to the inner film 16*a* by, for example, weak spot heat seal, a part (hatched part) of the film piece 14*a* is securely fixed to the inner film 16*a* by heat seal. Note that, the film piece 14*b* is fixed to the inner film 16*b*, by heat seal, in a sealed part (hatched part).

In the present embodiment, the film piece 14*a* acts as the dividable section 12. Namely, the film piece 14*a*, which has been connected by weak spot heat seal, is peeled, from the other film piece 14*b* and the inner film 16*a*, from the division-starting point P, and is connected to the inner film 16*a* in the sealed part (hatched part) only. In the present embodiment too, the one side part of the wrapper can be separated from the other side part thereof, in one action, by pulling the film piece 14*a* (the dividable section).

Figure 25:
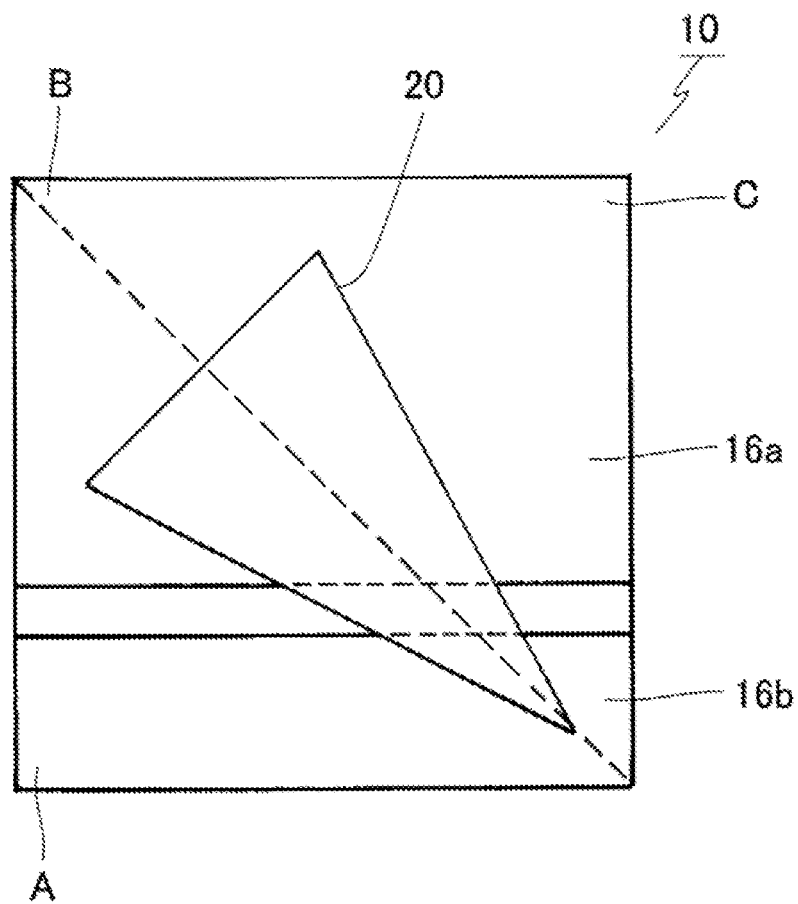
FIG. 25 An explanation view of an example of the rice wrapper which is formed into a square shape.

In each of the above described embodiments, the rectangular wrapper 10 is explained. However, a square-shaped wrapper 10 shown in FIG. 25 can be used in the present invention.

In this case, the sushi-rice 20 is placed on a diagonal line, and the wrapper is formed into the deformed cone shape, in a state where the corners A and C are brought into close relationship, so as to wrap the sushi-rice as the hand-rolled sushi.

What is claimed is:

1. Wrapped rice wrapped with a rice wrapper, the rice wrapper comprising:
    an outer film being formed into a rectangular shape having a long side and a short side and provided with a strip-shaped dividable part along one long side of the outer film, said strip-shaped dividable part includes a first side edge and a second side edge;
    an inner film includes a first inner film and a second inner film, aligned on the outer film wherein end edge parts in the direction of a width of the first and second inner films are overlapped, and fixed to the outer film by a heat sealing part extending continuously along peripheral edge parts along the entire long side of the outer film and along the short side to the first side edge of the strip-shaped dividable part, the first inner film is wider than the second inner film;
    an eatable sheet being inserted between the outer film and the inner film;
    wherein a first separated part of the outer film separated by the strip-shaped dividable part and the first inner film connected to the first separated part of the outer film, is separable from a second separated part of the outer film separated by the strip-shaped dividable part and the second inner film connected to the second separated part of the outer film, when the outer film is separated by the strip-shaped dividable part;
    wherein the strip-shaped dividable part first side edge is located alongside of the one long side of the outer film, and the heat sealing part of one short side of the outer film is extended until reaching the first side edge to seal the first side edge to the heat sealing part, the first side edge connected to the first separated part of the outer film is unable to be separated from the first separated part at the seal of the first side edge to the heat sealing part, the second side edge is displaced a predetermined distance from the first side edge and extends along the one long side of the outer film to the one short side of the outer film and is not sealed to the heat sealing part, said second side edge is able to be separated from the second separated part of the outer film along the second side edge, so that the first separated part can be separated from the second separated part in one action, by pulling the strip-shaped dividable part;
    wherein one corner part between the one short side and other long side of the rice wrapper being positioned on a middle part of the one long side, the one corner part is wound as an inner wrapping part, and a part of other short side of the rice wrapper is wound on the inner wrapping part as an outer wrapping part and fixed on the inner winding part, thereby the rice wrapper is formed into a deformed cone shape in which a middle part of the other long side is formed as an apex; and the wrapped rice comprises a cone-shaped rice put in the rice wrapper, which has been formed into the deformed cone shape.

2. The wrapped rice according to claim 1, wherein a covering member for covering an exposed part of the rice to be wrapped is provided to the outer film, and an end part of the dividable section is connected to the covering member.

3. The wrapped rice according to claim 1, wherein the dividable section is shifted toward the one long side part of the rice wrapper from a center of the outer film in the width direction of the outer film.

\* \* \* \* \*